United States Patent
Weiss (10) Patent No.: US 7,464,082 B2
(45) Date of Patent: Dec. 9, 2008

(54) METHODS FOR DE-SERIALIZING DATA OBJECTS ON DEMAND

(75) Inventor: Andrew D. Weiss, Red Bank, NJ (US)

(73) Assignee: International Business Machines Corporation, Armonk, NY (US)

( * ) Notice: Subject to any disclaimer, the term of this patent is extended or adjusted under 35 U.S.C. 154(b) by 487 days.

(21) Appl. No.: 10/998,409

(22) Filed: Nov. 29, 2004

(65) Prior Publication Data

US 2006/0117061 A1  Jun. 1, 2006

(51) Int. Cl.
*G06F 17/30* (2006.01)
(52) U.S. Cl. ......................................... 707/4; 707/104.1
(58) Field of Classification Search ............... 707/1–10, 707/100

See application file for complete search history.

(56) References Cited

U.S. PATENT DOCUMENTS

2004/0123235 A1  6/2004  Yeh et al.
2004/0143791 A1  7/2004  Ito et al.
2004/0189717 A1  9/2004  Conally et al.
2005/0114763 A1*  5/2005  Nonomura et al. .......... 715/513
2006/0253465 A1*  11/2006  Willis et al. ................. 707/100

* cited by examiner

*Primary Examiner*—Mohammad Ali
*Assistant Examiner*—Sangwoo Ahn
(74) *Attorney, Agent, or Firm*—Shumaker & Sieffert, P.A.

(57) ABSTRACT

The invention is directed to methods for de-serializing data from a software system, such as an enterprise software system, upon request. For example, methods are described for converting a data description language, such as the extensible markup language (XML), representation of data from an enterprise software system to an object when requested by a software application. A computing device connected to the enterprise software system loads multidimensional data via an XML data stream. The XML data is de-serialized to create objects as the objects are requested by software applications executing on the computing device. The remaining XML data may be stored on the computing device until the corresponding objects are requested by the software applications.

9 Claims, 6 Drawing Sheets

METHODS FOR DE-SERIALIZING DATA OBJECTS ON DEMAND

TECHNICAL FIELD

The invention relates to software systems and, in particular, techniques for de-serializing a data description language stream into an object.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligent tools, enterprise reporting tools, project and resource management systems and other enterprise software systems.

In a typical computing environment, remove client devices often retrieve enterprise data from the enterprise software system. However, the enterprise software system often stores the enterprise data as multidimensional data comprising complicated object definitions and data types that cannot easily be transmitted to the user device via most communication protocols, such as the Transmission Control Protocol/Internet Protocol (TCP/IP). Therefore, the enterprise planning system may serialize the multidimensional data into a data description language, such as the extensible markup language (XML), which expresses the enterprise planning data as plain text for transmission.

Upon receiving the serialized transmission, the client device de-serializes the XML stream into objects or, in the case of multi-dimensional data, a hierarchy of objects. The representation of multi-dimensional data as objects can include tens of thousands of object instantiations. Some programming languages, although optimized for object-oriented programming, begin to slow down during the creation and especially the deletion of many small objects. In an attempt to prevent the slow down, the XML representation of the data may be broken into multiple XML calls. The user device may then retrieve subsets of the XML from the enterprise software system as needed. For example, the client device may initially on retrieve the highest levels of the object hierarchy, and retrieve subsequent levels when requested by the software executing on the client device. In this way, the client device does not retrieve data from the enterprise system that is never actually needed by the client device. This process of retrieving data from the enterprise system as needed is often referred to as "load on demand."

SUMMARY

In general, the invention is directed to techniques for de-serializing data from a software system, such as an enterprise software system, as needed. For example, techniques are described for de-serializing (i.e., converting) a data description language, such as the extensible markup language (XML), representation of data from an enterprise software system to an object when needed by a software application within the enterprise software system.

The techniques allow an XML stream of serialized data representing an object model to be loaded onto a computing device from the enterprise software system. The XML data is de-serialized to create objects as the objects are requested by software applications executing on the computing device. The remaining XML data may be stored on the computing device until the corresponding objects are requested by the software applications.

The serialized data received from the enterprise software system may comprise multi-dimensional data, which can be de-serialized into a hierarchy of objects. The "de-serialize on demand" techniques discussed herein allow large object hierarchies to be constructed on an as-needed basis. The techniques may reduce object instantiation and deletion time by only de-serializing the stored XML data and creating those objects requested by the software applications.

In addition, the techniques described herein may be utilized in conjunction with a "load on demand" process that selectively retrieves the XML data from the enterprise software system when requested. For example, portions of object hierarchies may be selectively retrieved from the enterprise software system as XML data when needed. The retrieved XML data may be buffered and only de-serialized into particular objects when the specific objects are requested by the software applications executing on the computing device.

In one embodiment, a method comprises storing serialized data in accordance with a data description language to define a hierarchical object model having a plurality of data objects. The method further comprises receiving a request to access one of the plurality of data objects defined by the stored serialized data, and processing at least a portion of the serialized data to create the requested data object in response to the request.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
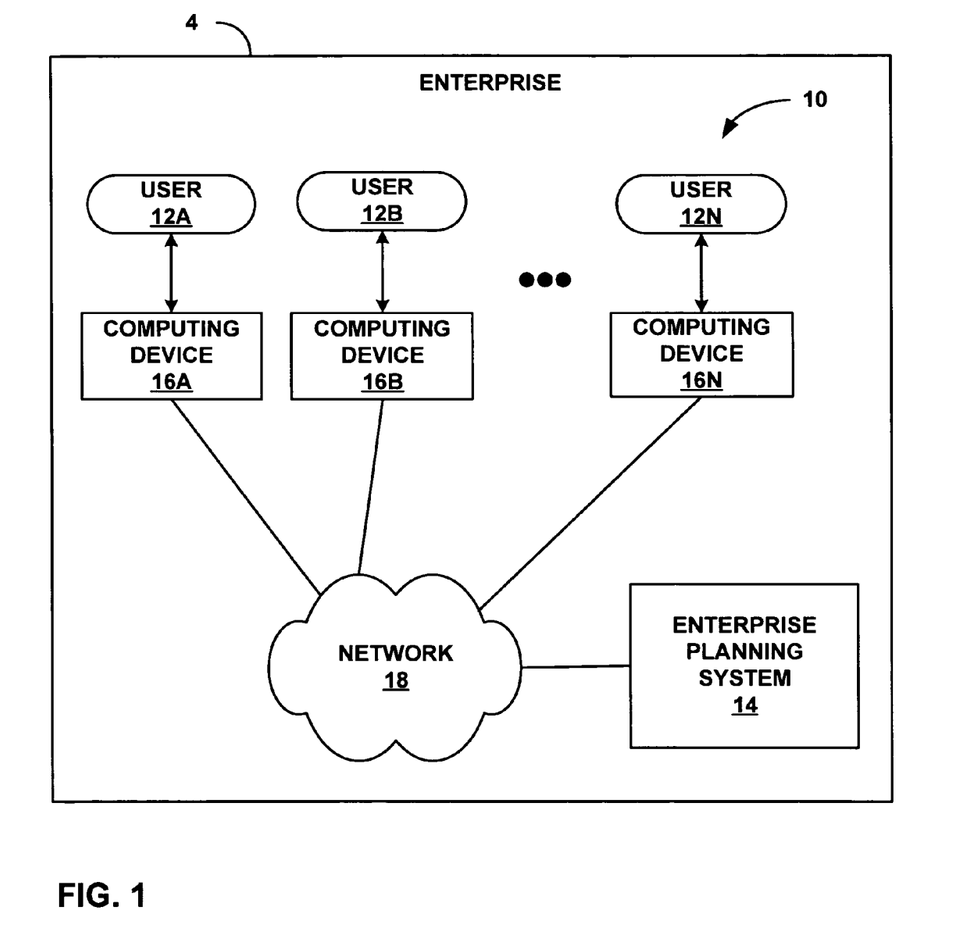
FIG. 1 is a block diagram illustrating an example computing environment in which a plurality of users interact with an enterprise planning system that enables and automates the reconciliation of top-down targets with detailed bottom-up forecasts.

FIG. 1 is a block diagram illustrating an example enterprise 4 having a computing environment 10 in which a plurality of users 12A-12N (collectively, "users 12") interact with an enterprise planning system 14. In the system shown in FIG. 1, enterprise system 14 is communicatively coupled to a number of computing devices 16A-16N (collectively, "computing devices 16") by a network 18. Users 12 interact with their respective computing devices to access enterprise planning system 14.

For exemplary purposes, the invention will be described in reference to an enterprise planning system, such as an enterprise financial or budget planning system. The techniques described herein may be readily applied to other software systems, including other large-scale enterprise software systems. Examples of enterprise software systems include order management systems, inventory management systems, sales force management systems, business intelligent tools, enterprise reporting tools, project and resource management systems and other enterprise software systems.

In general, enterprise planning system 14 enables and automates the reconciliation of top-down targets with detailed bottom-up forecasts for an enterprise. Enterprise planning system 14 implements and manages an enterprise planning process, which can be divided into three functions: (1) modeling, (2) contribution, and (3) reconciliation.

Initially, high-level enterprise managers or executives, referred to as analysts, define organizational targets, and build planning models for the enterprise. The analysts may include, for example, financial analysts, such as the chief financial officer, senior financial analysts or product and sales analysts. More specifically, the analysts develop a model having a number of hierarchically arranged nodes representing various cost centers within the organization, such as business units or departments. The analysts specify corporate target data for each node of the organizational hierarchy. Corporate target data may include financial data, revenue data, order data, inventory data, and the like, depending on the particular enterprise planning activity being carried out by the enterprise. The analysts then assign one or more enterprise users to each node, such as managers, supervisors, sales representatives, lab managers, or the like, that are responsible for enterprise planning for the cost center corresponding to the node. Each enterprise user may be designated as a contributor that provides planning data to enterprise planning system 14, a reviewer that accepts or rejects contributions from the contributors, or both. The contributors and reviewers may be authorized users within the enterprise or within other entities coupled to network 18, such as suppliers or customers.

Next, enterprise users 12 that are designated as contributors interact with enterprise planning system 14 to input detailed forecasts in the form of contribution data. As described above, enterprise users 12 may provide detailed financial forecasts, revenue forecasts, order forecasts, inventory forecasts, estimated resource requirements, and the like, depending on the particular enterprise planning activity being carried out by the enterprise.

Enterprise planning system 14 automates the reconciliation of the forecast data with the corporate target data provided by the analysts. In particular, enterprise planning system 14 operates in accordance with a defined model, i.e., the enterprise planning model created by the analysts, to provide a hierarchical planning process having multiple reconciliation levels. As each of the contributors provides his or her contribution data, enterprise planning system 14 automatically aggregates the contribution data across the enterprise in real-time, and provides access to the aggregated data to enterprise users 12 designated as reviewers associated with higher levels of the enterprise. In particular, upon receiving contribution data from the contributors, enterprise planning system 14 identifies all higher levels of the organizational model affected by the newly received contribution data, and calculates new aggregate totals at each level in real-time.

Consequently, the reviewers view aggregated data across the enterprise in real-time during the enterprise planning session. At each level, enterprise planning system 14 ensures that the reviewers, as defined by the nodes of the enterprise model, reconcile the target data with the forecast data. Each of the reviewers may, for example, reject or accept the contribution data in view of corporate targets provided by the analysts. This process continues until the contribution data is ultimately approved by the highest level of the organizational hierarchy, thereby ensuring that the contribution data from the contributors reconciles with corporate targets provided by the analysts.

In this manner, enterprise planning system 14 may provide more accurate enterprise planning than with conventional techniques. For example, enterprise planning system 14 may improve the accuracy and predictability of enterprise planning by enabling organizations to reconcile corporate models and organizational targets with detailed forecasts. The techniques may provide a platform that delivers collaborative, real-time planning capabilities, without requiring offline consolidation and aggregation of forecasts. Because enterprise planning system 14 can aggregate contribution data in real-time, all users 12 can be presented with an accurate, up-to-date view of the numbers. Further, the architecture of enterprise planning system 14 can readily scale to thousands of users, and may be designed around best planning practices. In addition, the techniques enabling high participation by enterprise users 12, i.e., the contributors and reviewers, allowing accurate planning cycles to be reduced Enterprise users 12 may use a variety of computing devices to interact with enterprise planning system 14 via network 18. For example, an enterprise user may interact with enterprise planning system 14 using a laptop computer, desktop computer, or the like, running a web browser, such as Internet Explorer™ from Microsoft Corporation of Redmond, Wash. Alternatively, an enterprise user may use a personal digital assistant (PDA), such as a Palm™ organizer from Palm Inc. of Santa Clara, Calif., a web-enabled cellular phone, or similar device.

Network 18 represents any communication network, such as a packet-based digital network like the Internet. In this manner, system 10 can readily scale to suit large enterprises. Enterprise users 12 may directly access enterprise planning system 14 via a local area network, or may remotely access enterprise planning system 14 via a virtual private network, remote dial-up, or similar remote access communication mechanism.

Enterprise planning system 14 may utilize a "cut-down" process by which the multidimensional data store is "sliced" for each user 12 in accordance with the defined enterprise model. During this process, enterprise planning system 14 identifies areas of the defined model to which users 12 are assigned, either as contributors or reviewers, and "slices" the data store based on the assignments. When a given user 12 logs in and proceeds with an enterprise planning activity, enterprise planning system 14 communicates the respective data slice to the respective computing device 16 for display to the user via the extended spreadsheet application. In this fashion, enterprise planning system 14 need not communicate the entire model to each of users 12, thereby reducing communication time as well as resource requirements. Instead, each user 12 receives only relevant information. Users 12 interact with computing devices 16 to capture contribution data, and to reconcile the contribution data with organizational targets.

The multidimensional data received from enterprise planning system 14 often comprises complicated object definitions. For this reason, enterprise planning system 14 serializes the multidimensional data into a data description language, such as the extensible markup language (XML), which expresses the data as plain text for transmission to computing devices 16.

As described herein, computing devices 16 apply techniques for de-serializing the data description language stream into data objects when specifically needed by enterprise planning software executing on the computing devices. Specifically, each of computing devices 16 includes an application programming interface (API) for receiving data requests from a software application executing on computing device 16 and returning the de-serialized data to the software application.

The data slices may comprise multi-dimensional data. The representation of the multi-dimensional data as objects can include tens of thousands of object instantiations.

For example, computing devices 16 load XML representations of the multidimensional data (i.e., the respective slices associated with users 12) from enterprise software system 14. When a software application executing on one of computing devices 16 requests access to an object associated with the multidimensional data, an object model interface of the respective computing device 16 directs a de-serialization module to convert (i.e., de-serialize) a respective portion of the XML data into the requested data object.

Often the XML data represents a hierarchy of data objects comprising parent objects and child objects. As a result, the parent objects are de-serialized when specifically requested by the enterprise planning software, and the child objects lower in the hierarchy remain stored as XML data until requested by the software application.

In this fashion, an object hierarchy may be constructed from the XML data in a top-down fashion as needed. As a result, the "de-serialize on demand" techniques reduces object instantiation and deletion time associated with the object hierarchy by only de-serializing and instantiating those objects that are actually requested by a software application.

In addition, a "load on demand" process may used in conjunction with the "de-serialize on demand" process described herein. Client device 16A, for example, may selectively retrieve portions of object hierarchies from enterprise software system 14 as XML data when needed. The retrieved XML data may be buffered and only de-serialized into particular objects when the specific objects are requested by the software applications executing on the computing device.

Figure 2:
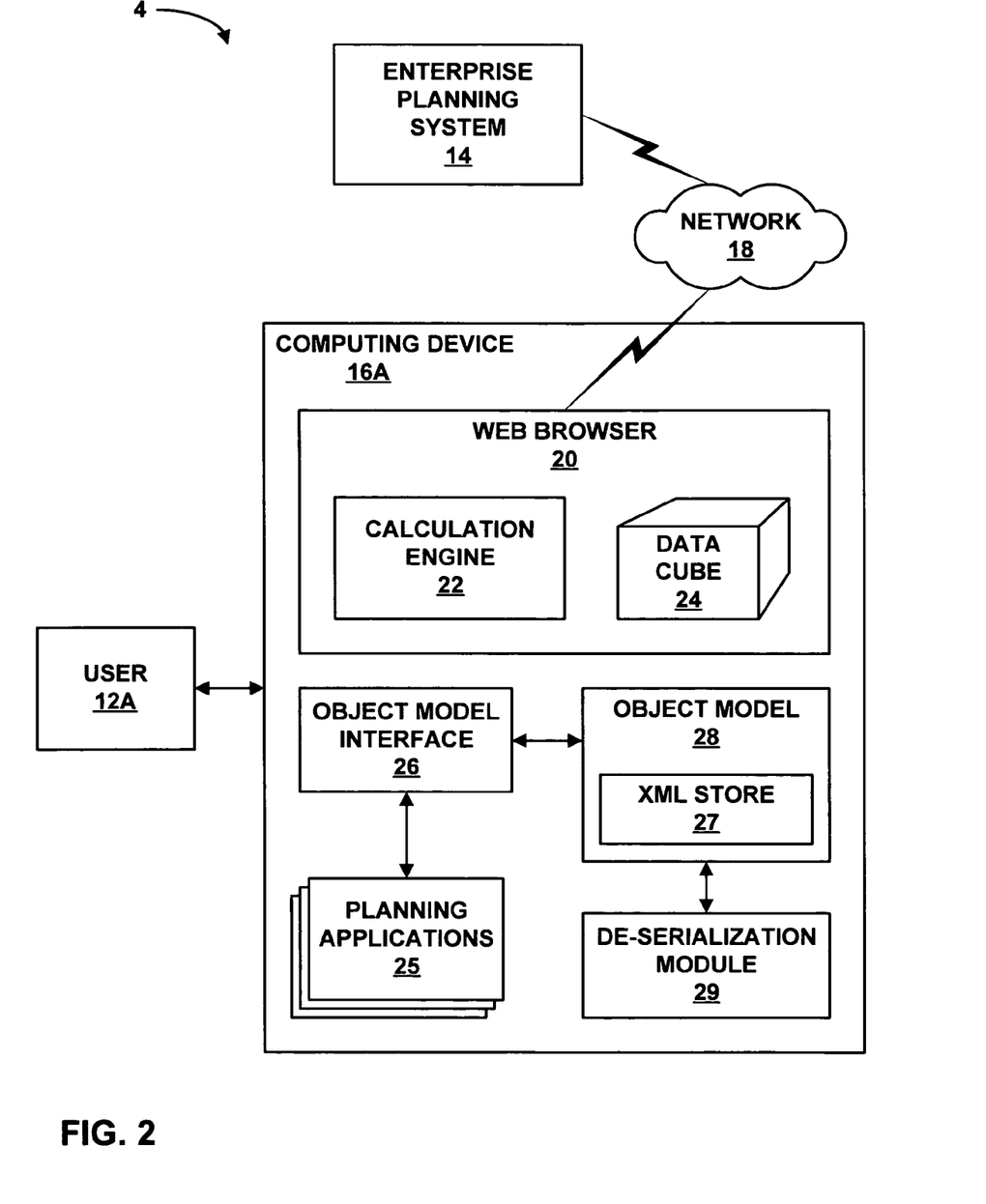
FIG. 2 is a block diagram illustrating one embodiment of a remote computing device for interacting with the enterprise planning system of FIG. 1.

FIG. 2 is a block diagram illustrating one embodiment of a computing device 16A for interacting with enterprise planning system 14. In the exemplary embodiment, computing device 16A includes a web browser 20, one or more planning applications 25, an object model interface 26, an object model 28, and a de-serialization module 29. Calculation engine 22 and data cube 24 are installed within web browser 20 for use during the enterprise planning session. Computing device 16A include computer-readable media to store executable instructions for causing programmable processors to carry out the methods described herein.

In one embodiment, calculation engine 22 comprises a forward calculation engine 22 wrapped in an Active X object built in an array-based language. In the example of enterprise planning, user 12A may interact with web browser 20 to enter and manipulate enterprise planning data, such as budget or forecast data. Data cube 24 contains planning data, which may include top-down targets, and bottom-up contribution data, and allows all calculations for an enterprise planning session to be performed locally by computing device 16A. Therefore, in this example, a contributor can modify his or her respective contribution data, and perform calculations necessary for the enterprise planning process without necessarily accessing enterprise planning system 14. In other words, calculation engine 22 and data cube 24 may be maintained locally (e.g., as ActiveX components) via computing device 16A. User 12A may save the planning data locally, and submit the planning data to enterprise planning system 14 for aggregation with the planning data from other users 12.

Enterprise planning system 14 automatically aggregates the contribution data across enterprise 4 in real-time, and provides access to the aggregated data to reviewers associated with higher levels of the enterprise. This process continues until the contribution data is ultimately approved by the reviewers associated with the highest level of the organizational hierarchy, thereby ensuring that the contribution data from the contributors reconciles with corporate targets. In other embodiments, calculation engine 22 and data cube 24 may be maintained only at enterprise planning system 14 and installed locally upon computing devices 16.

Planning applications 25 represent software applications executing on computing device 16A. For example, planning applications 25 may include reporting tools, modeling tools, spreadsheet applications, data collection templates, business intelligence tools, or other types of enterprise planning applications.

Object model interface 26 comprises an application programming interface API that exposes object model 28. For example, object model 28 may be a metadata model for data cube 24.

In general, object model 28 represents any hierarchy of data objects, and may comprise a series of collections and objects within the collections. In other words, object model 28 may comprises a hierarchy of objects, each of which contains a collection which in turn provides access to one or more objects. Object model 28 may be wrapped to protect the objects within the collections. In this way, user 12A and planning applications 25 cannot alter the data within object model 28. Instead, planning applications 25 retrieve the objects from object model 28 via object model interface 26. In particular, object model interface 26 receives data requests from planning applications 25 and returns the requested de-serialized data to planning applications 25.

As illustrated in FIG. 2, object model 28 includes an XML store 27 such that an XML representation of enterprise data required during the planning session may be loaded from enterprise planning system 14 before de-serialization into object model 28. XML store 27 may include an XML stream for an entire slice associated with user 12A. In other cases, XML store 27 may include a subset of the slice; the remaining portion of the slice is loaded from enterprise planning system 14 when needed by planning applications 25 using a load on demand process.

When one of planning applications 25 requests access to object model 28, object model interface 26 determines whether the requested object has already been instantiated. If an instantiation for the desired object does not exist in object model 28, object model interface 26 identifies the corresponding XML data within XML store 27. Object model interface 26 then directs de-serialization module 29 to de-serialize the XML that represents the requested data into an object in object model 28. Object model interface 26 may then return the de-serialized data object (or a handle to the object) to the requesting one of planning applications 25. The remaining data objects of object model 28 (i.e., the lower level child objects) remain stored in XML store 27 in XML form until requested by one of planning applications 25.

In some situations, planning applications 25 may request information about data objects stored in XML store 27. For example, one of planning applications 25 may issue a request to count the data objects within a given collection. In that case, object model interface 26 need not instantiate and directly access the particular data objects. As a result, object model interface 26 may return the requested information without de-serializing and instantiating the associated objects.

The following XML listing illustrates exemplary serialized data that may be provided by enterprise planning system 14 and stored within XML store 27. In this example, the serialized data defines an object hierarchy having four dimensions: submissions, company, accounts and periods. For each dimension, the XML defines one or more items, and each item has one or more attributes.

```
<?XML version="1.0" encoding="utf-8" ?>
<response>
    <dimension dimnm="Submissions" dimid="Submissions" dimtype="Submission">
        <item inm="2004 ACTUAL" iid="2004ACTUAL">
            <att nm="Calc" val="0" dt="B" />
            <att nm="Repair" val="0" dt="B" />
            <att nm="Lock" val="0" dt="B" />
        </item>
        <item inm="2003 ACTUAL" iid="2003ACTUAL">
            <att nm="Calc" val="0" dt="B" />
            <att nm="Repair" val="0" dt="B" />
            <att nm="Lock" val="1" dt="B" />
        </item>
    </dimension>
    <dimension dimnm="Company" dimid="Company" dimtype="Component">
        <item inm="XYZ Mining" iid="Co1">
            <att nm="Type" val="Type 4" dt="S" />
            <att nm="Class" val="Class #01" dt="S" />
        </item>
        <item inm="Widgets Corp" iid="Co2">
            <att nm="Type" val="Type 1" dt="S" />
            <att nm="Class" val="Class #01" dt="S" />
        </item>
    </dimension>
    <dimension dimnm="Accounts" dimid="Accounts" dimtype="Account">
        <item inm="PETTY CASH" iid="100XX">
            <att nm="DecPrec" val="2" dt="N" />
            <att nm="Type" val="1" dt="N" />
            <att nm="Round" val="1" dt="N" />
            <att nm="Basis" val="0" dt="N" />
            <att nm="Color" val="1" dt="B" />
        </item>
        <item inm="CASH ON HAND" iid="101XX">
            <att nm="DecPrec" val="2" dt="N" />
            <att nm="Type" val="1" dt="N" />
            <att nm="Round" val="1" dt="N" />
            <att nm="Basis" val="0" dt="N" />
            <att nm="Color" val="1" dt="B" />
        </item>
        <item inm="CASH IN BANK" iid="103XX">
            <att nm="DecPrec" val="2" dt="N" />
            <att nm="Type" val="1" dt="N" />
            <att nm="Round" val="1" dt="N" />
            <att nm="Basis" val="0" dt="N" />
            <att nm="Color" val="1" dt="B" />
        </item>
    </dimension>
    <dimension dimnm="Periods" dimid="Periods" dimtype="Period">
        <item inm="January" iid="Jan">
            <att nm="Text" val="0" dt="B" />
            <att nm="Calc" val="0" dt="B" />
            <att nm="Pointer" val="0" dt="B" />
        </item>
        <item inm="February" iid="Feb">
            <att nm="Text" val="0" dt="B" />
            <att nm="Calc" val="0" dt="B" />
            <att nm="Pointer" val="0" dt="B" />
        </item>
        <item inm="March" iid="Mar">
            <att nm="Text" val="0" dt="B" />
            <att nm="Calc" val="0" dt="B" />
            <att nm="Pointer" val="0" dt="B" />
        </item>
    </dimension>
</response>
```

Figure 3:
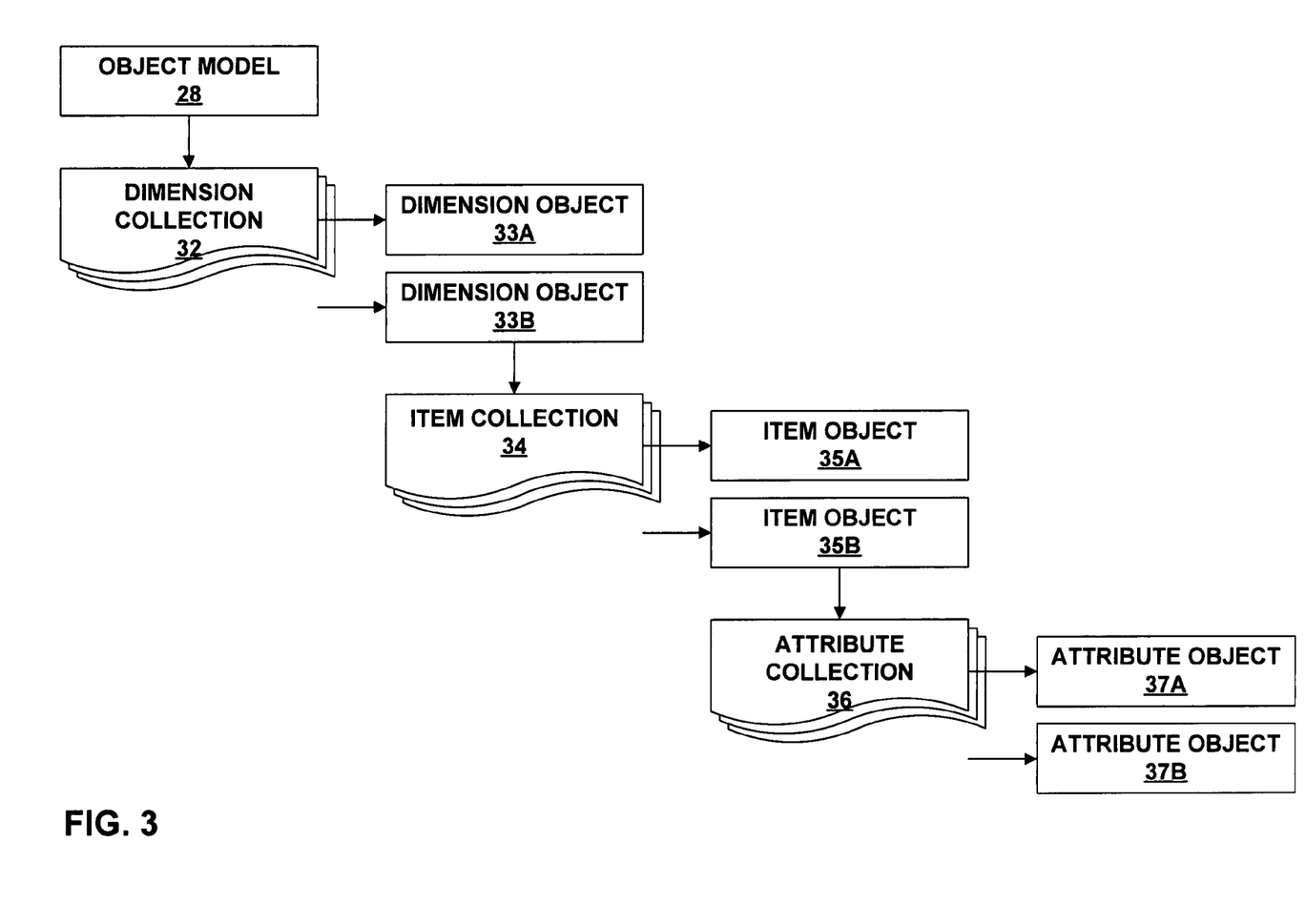
FIG. 3 illustrates the structure of an object model in further detail.

FIG. 3 illustrates exemplary structure of one embodiment of object model 28 in further detail. In this example embodiment, object model 28 comprises a hierarchy of objects, each of which contains a collection which in turn provides access to one or more objects. The exemplary structure may be particularly useful in representing a dimension of multidimensional data.

In particular, a dimension of multidimensional data generally is defined as a hierarchy of parent "nodes" and child "subnodes." The dimension hierarchy may be represented by the object hierarchy within object model 28. In other words, each object within object model 28 represents a node within the dimension and provides access to the multidimensional data associated with the respective node.

In the illustrated embodiment, object model 28 includes a dimension collection 32, which contains dimension objects 33A and 33B. In other embodiments, dimension collections 32 may contain any number of dimension objects 33. In some cases, object model interface 26 may direct de-serialization module 29 to create all objects within dimension collection 32 when one of planning applications 25 attempts to access either of dimension objects 33A or 33B. In other cases, object model interface 26 may direct de-serialization module 29 to only create the requested object. In either case, object model 28 stores the XML data that describes each of dimension objects 33, and only de-serializes the stored XML data when one or planning applications 25 requests multidimensional data represented by the objects.

As further illustrated, each of dimension objects 33 may include an item collection. FIG. 3 illustrates an expansion of item collection 34 within dimension object 33B. In this example, item collection 34 contains item object 35A and item object 35B. Item object 35B is shown to include an attribute collection 36, which contains attribute objects 37A and 37B.

FIG. 3 illustrates only a portion of object model 28. Although not illustrated, object model 28 may have any number of hierarchical levels (collections), and each level may include any number of objects. For enterprise planning systems, object model 28 may contain tens of thousands of objects representing the multidimensional enterprise data.

Figure 4:
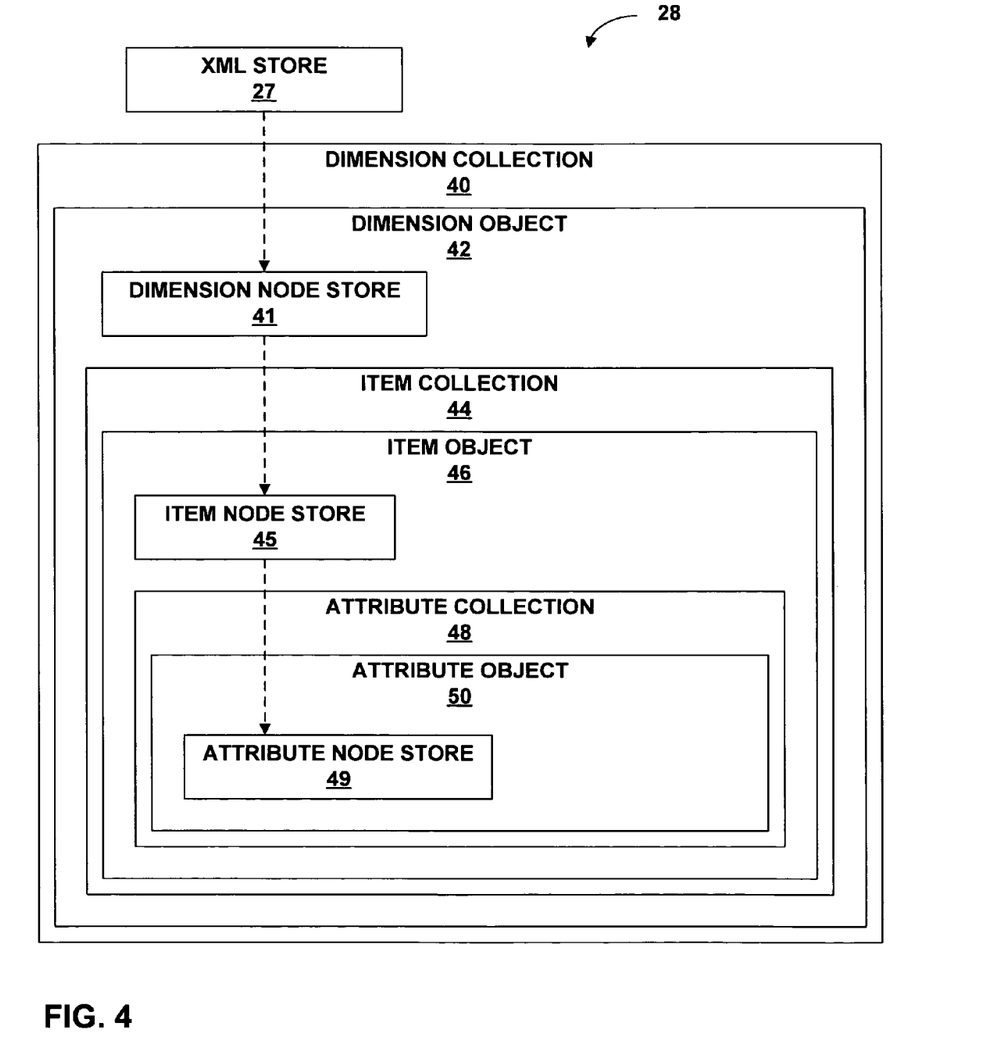
FIG. 4 illustrates an exemplary instantiation of objects in an object model.

FIG. 4 illustrates an exemplary instantiation of objects in object model 28 of computing device 16A. For purposes of illustration, object model 28 is shown to include a hierarchy of collections and objects as described in reference to FIG. 3. Although FIG. 4 illustrates only one object within each collection, any number of objects may be contained within each collection.

When one of planning applications 25 requests data associated with a dimension object 42 within a dimension collection 40, object model interface 26 directs de-serialization module 29 to access XML store 27, convert the corresponding XML data and instantiate dimension object 42.

Once dimension object 42 is instantiated, object model interface 26 passes dimension object 42 the XML data associated with the dimension object. Dimension object 42 uses attributes specified in the XML data to prepare properties of the object. Dimension object 42 stores the XML data within dimension node store 41 for use as needed to create its child objects, i.e., object of item collection 44 in this example.

In similar fashion, when one of planning applications 25 requests multidimensional data associated with an item object 46 within item collection 44, object model interface 26 directs de-serialization module 29 to convert the corresponding XML data stored in dimension node store 41 and instantiate the item object. Once item object 46 is instantiated, object model interface 26 passes item object 46 its corresponding XML data. Item object 46 uses attributes included in the XML data to prepare properties of the object, and stores the XML data within item node store 45 for use as needed to create child objects from attribute collection 48.

When one of planning applications 25 requests data associated with an attribute object 50 within attribute collection 48, object model interface 26 directs de-serialization module 29 to convert the corresponding XML data stored in item node store 45. Again, once attribute object 50 is instantiated, object model interface 26 passes attribute object 50 its respective XML data. Attribute object 50 uses attributes included in the XML data to prepare properties of the object. If attribute object 50 has any child objects defined within the XML data, the attribute object stores its XML data within attribute node store 49.

In this manner, once instantiated, the objects at each level of object model 28 store their respective XML data, and utilize the XML data to instantiate child objects as needed.

Figure 5:
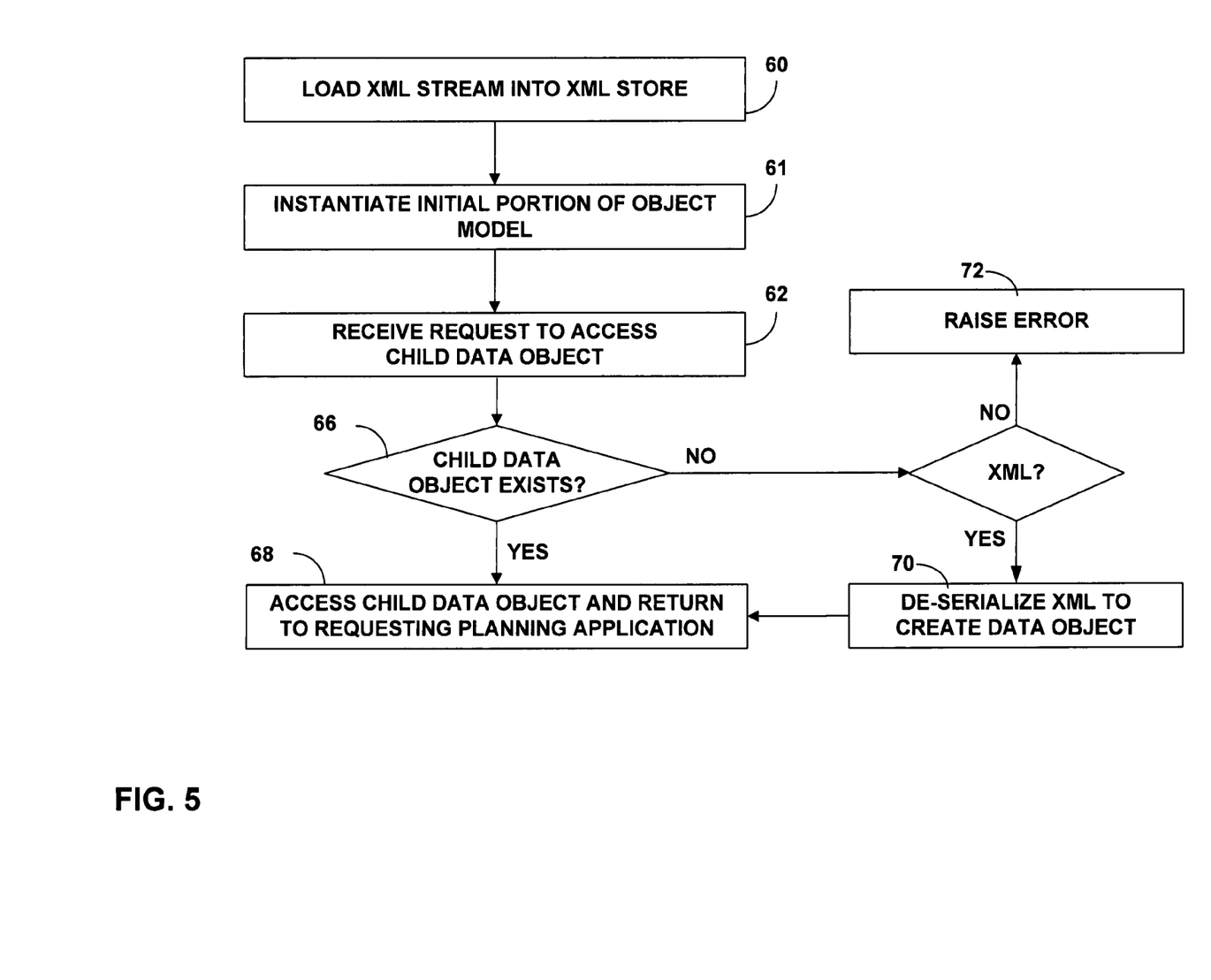
FIG. 5 is a flow chart illustrating a process of de-serializing on data objects on demand.

FIG. 5 is a flow chart illustrating example implementation of the de-serialize on demand process described herein. The de-serialize on demand process may be performed, for example, by computing device 16A illustrated in FIG. 2 when user 12A takes part in an enterprise planning session.

Initially, object model interface 26 loads an XML representation of multidimensional data from enterprise planning system 14 into XML store 27 (60). In some embodiments, an XML stream representing all of the planning data associated with user 12A (i.e. a "slice") may be loaded into XML store 27. In other embodiments, a load on demand processes may be utilized to load only a subset of the needed multidimensional data with the remaining data being loaded upon request by any of planning applications 25.

Upon loading the XML representation, object model interface 26 may de-serialize and instantiate an initial portion of object model 28 (61). For example, object model interface 26 may de-serialize and instantiate dimension collection 42 shown in the example of FIG. 4. During this process, object model interface 26 access XML store 27 to retrieve the corresponding XML data, de-serialize the corresponding XML data and instantiate dimension object 42. Object model interface 26 passes dimension object 42 the XML data associated with the dimension object for initialization of attributes subsequent use if needed to create child objects.

Next, any of planning applications 25 may issue requests via object model interface 26 to access object model 28 (62). For example, planning applications 25 may issue requests to access properties of the instantiated portion of object model 48, e.g., dimension collection 42 in this example. In this case, object model interface 26 returns the proper values without de-serializing additional XML data as the attributes have already been loaded.

However, planning application 25 may issue requests that require access to a child object (66). For example, planning application 25 may attempt to index a child object, iterate on the child objects or access an attribute associated with a child object.

In this case, object model interface 26 accesses object model 28 to determine whether the requested data object has already been instantiated within the object model (64, 66). If the data object does already exists (yes branch of 66), object model interface 26 access the requested child data object in accordance with the request. Object model interface 26 may, for example, return a handle to the child data object, return an attribute associated with the child data object, return a count of the child data objects or return some other parameter (68).

If, however, the requested child data object does not exist in object model 28 (no branch of 66), the parent data object de-serializes the requested child data object based on the stored XML data (70) and accesses the child data object in accordance with the original request (68). If the XML data store of the parent data object does not include the XML necessary to de-serialize the requested data object, the parent data object raises an error (72).

Figure 6:
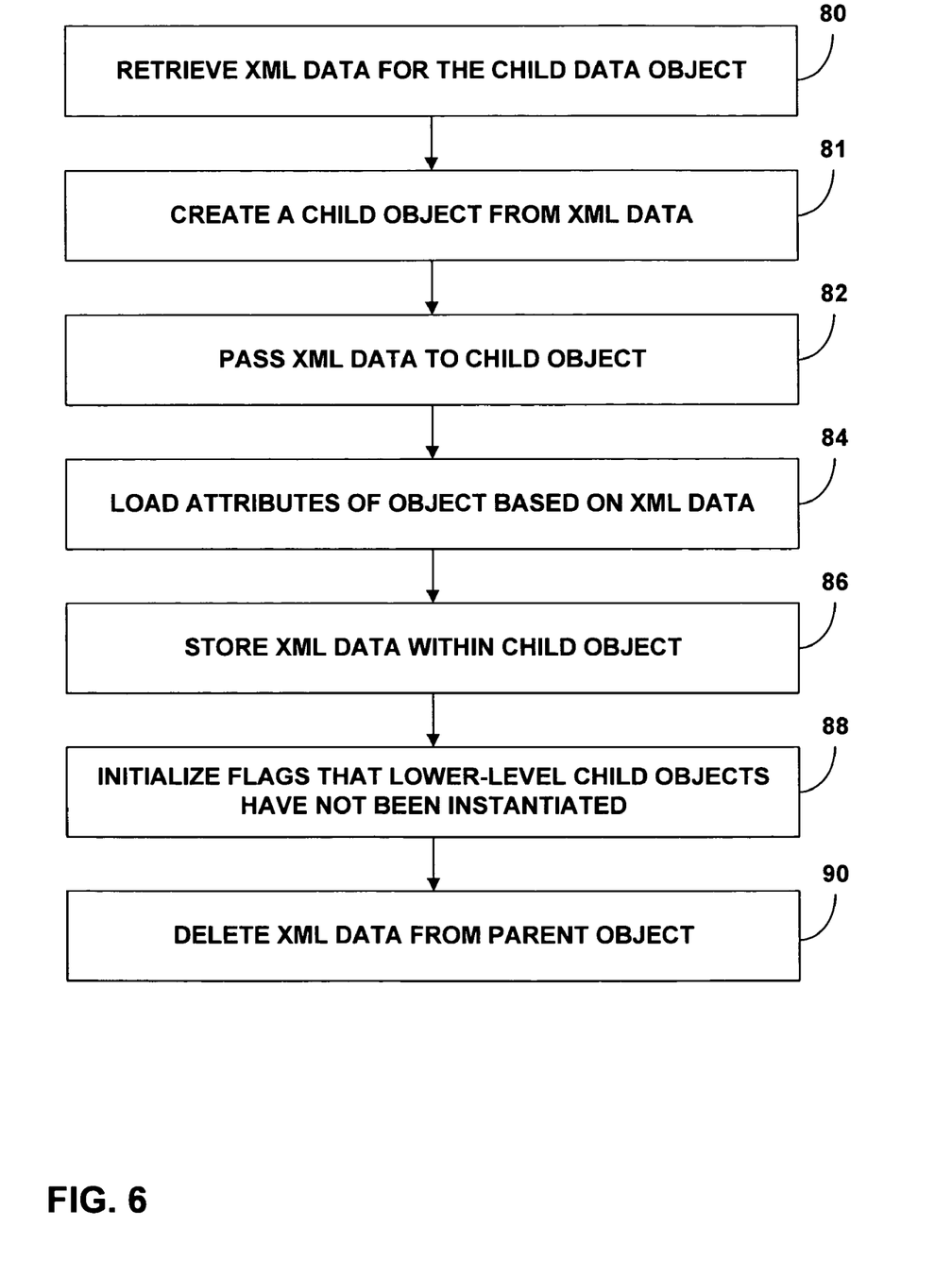
FIG. 6 is a flow chart illustrating the de-serialization processes in greater detail.

FIG. 6 is a flow chart illustrating the de-serialization processes in greater detail. Upon determining that a child data object needs to be instantiated, the parent data object retrieves the XML data for the child data object from its XML data store (80). The parent data object may, for example, maintain a temporary variable (e.g., a string variable) to store XML data associated with its child objects. The parent object then invokes de-serialization module 29 to create the child object based on its corresponding XML data (81).

The parent data object then passes the newly instantiated child object its corresponding XML data corresponding to (82), as described in FIG. 4. The newly created object then uses attributes included in the XML node to prepare its properties (84). In the event the XML defines lower-level child objects, the newly created object stores the XML data for later use to create the child objects when requested by one of planning applications 25 (86). The child object then initializes one or more flags or other marker indicating that its child objects have not yet been converted into objects (88).

Finally, after the child object has been instantiated and initialized, the parent object may delete the XML data used in creating the child node in order to conserve memory (90).

Various embodiments of the invention have been described. Although described in reference to an enterprise planning system, such as an enterprise financial or budget planning system, the caching techniques may be readily applied to other software systems, including other large-scale enterprise software systems. Examples of other enterprise software systems include order management systems, inventory management systems, sales force management systems, business intelligent tools, enterprise reporting tools, project and resource management systems and other enterprise software systems. Moreover, the techniques may be implemented on any type of computing device, including client devices, servers or other devices. These and other embodiments are within the scope of the following claims.

The invention claimed is:

1. A method comprising:

executing a plurality of software applications on a computing device; storing serialized data in accordance with a data description language to define a hierarchical object model having a plurality of data objects, wherein the hierarchical object model represents a hierarchy of a dimension of a multidimensional database of an enterprise software system;

receiving a first request from one of the plurality of software applications to access a first one of the plurality of data objects within the hierarchy of the dimension of the multidimensional database;

identify a first portion of the serialized data at a first level of the hierarchy of the dimension of the multidimensional database that corresponds to the first one of the plurality of data objects and data objects at levels above the first level without including data objects at levels below the first level;

processing the first portion of the serialized data to create the first one of the plurality of data objects in response to the first request;

storing the first one of the plurality of data objects in a computer-readable medium;

receiving a second request from one of the plurality of software applications to access a second one of the plurality of data objects within the hierarchy of the dimension of the multidimensional database as defined by the serialized data;

identifying a second portion of the serialized data at a second level of the hierarchy of the dimension of the multidimensional database below the first level that corresponds to the second one of the plurality of data objects and data objects at levels between the first level and the second level without including data objects at levels below the second level;

processing the second portion of the serialized data to create the second one of the plurality of data objects; and storing the second one of the plurality of data objects in the computer readable medium.

2. The method of claim 1, further comprising preparing properties of the first one of the plurality of data objects in accordance with the identified portion of the serialized data.

3. The method of claim 1, further comprising after creating the first one of the data objects, storing at least a portion of the serialized data within the first one of the data objects;

receiving a request to access a child data object of the first one of the data objects; and processing the portion of the serialized data stored within the first one of the data objects to create the child data object in response to the request.

4. The method of claim 1, wherein the first one of the data objects comprises a parent data object, the method further comprising setting a flag within the parent data object to indicate that one or more child data objects have not been created.

5. The method of claim 4, further comprising:

receiving a request from one of the software applications for information related to the child data objects; and returning the information to software application from the parent data object without processing the serialized data to create the child data objects.

6. The method of claim 1, wherein the data objects represent nodes and sub-nodes of the hierarchy of the dimension of the multidimensional database.

7. The method of claim 1, further comprising retrieving the serialized data from the enterprise software system, wherein the serialized data comprises a slice of multidimensional enterprise data associated with a user.

8. The method of claim 1, wherein the data description language comprises the extensible markup language (XML).

9. The method of claim 1, wherein the second one of the plurality of data objects is a child node of the first one of the plurality of data objects.

* * * * *